April 25, 1950 H. B. PALMER 2,505,626
COMBINED DOLL'S CRADLE AND SOUND-PRODUCING MEANS
Filed Nov. 22, 1946 4 Sheets-Sheet 1
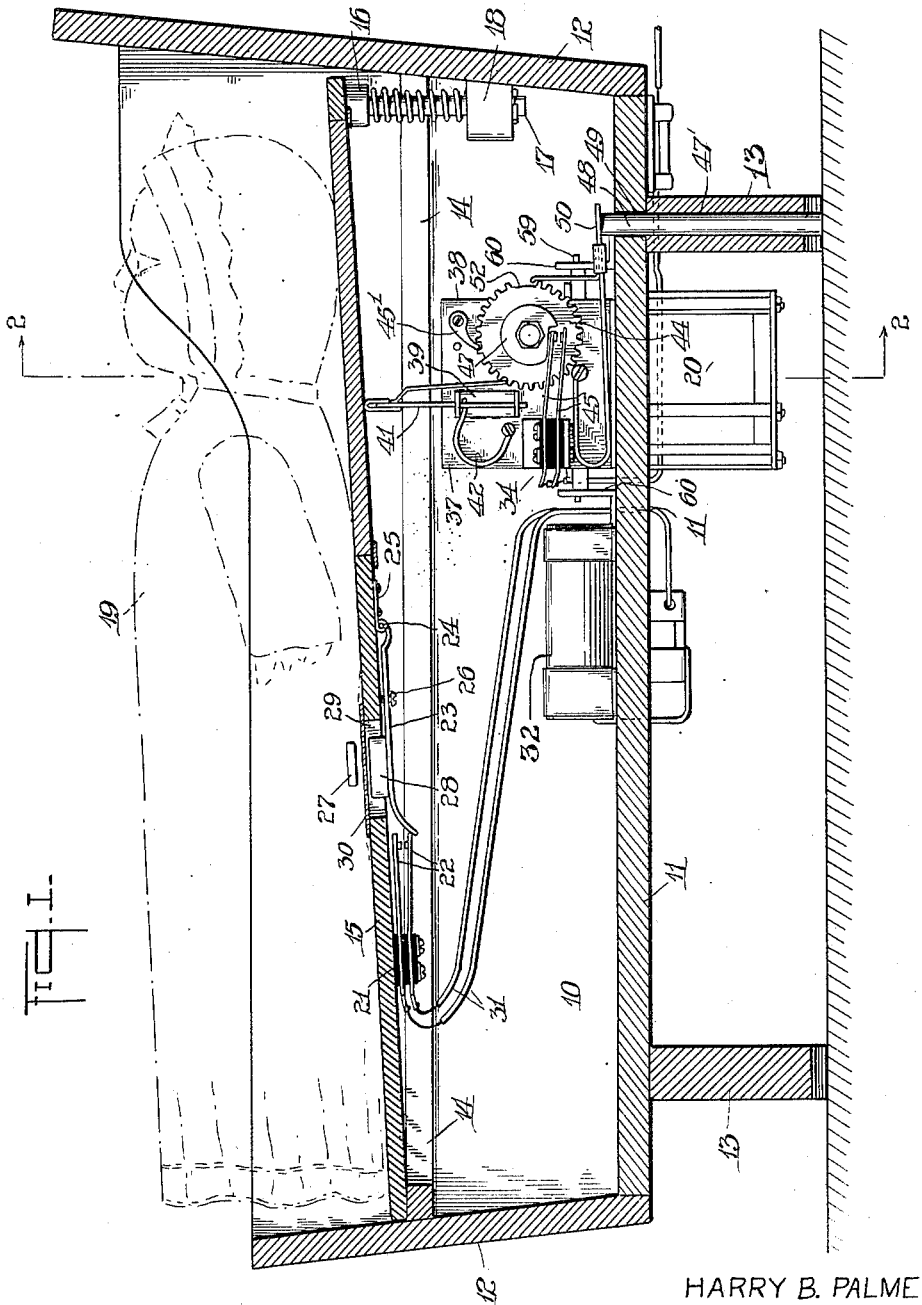
HARRY B. PALMER
INVENTOR
BY 
his ATTORNEY

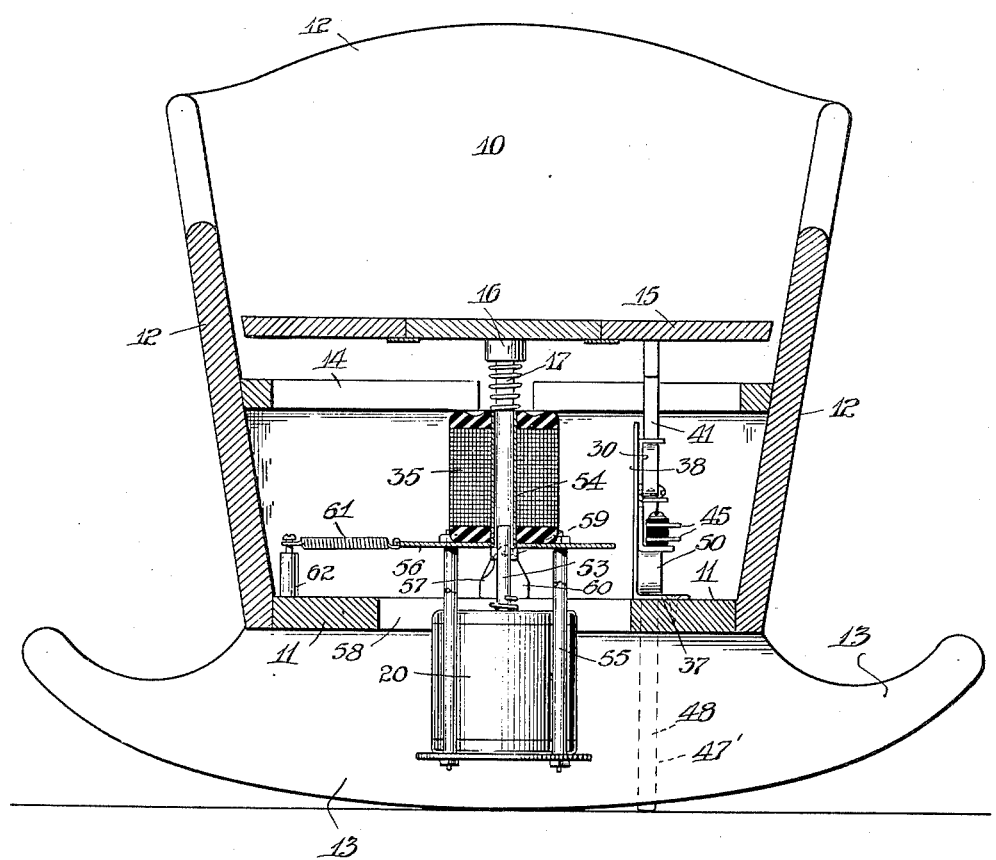

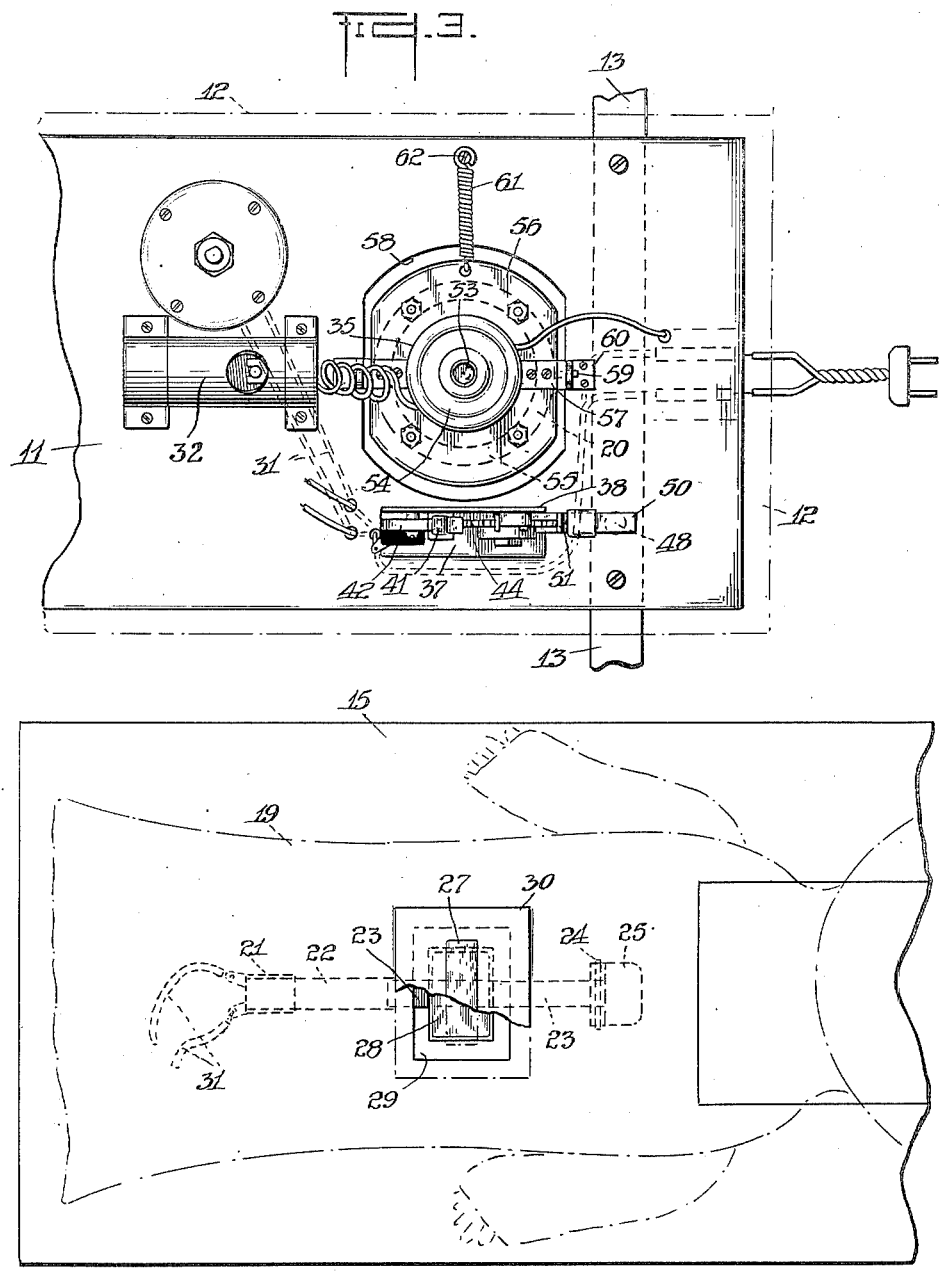

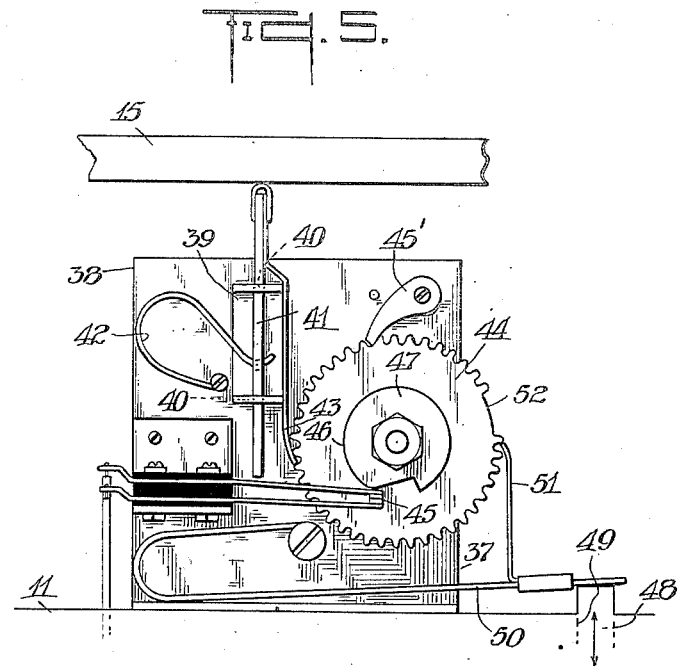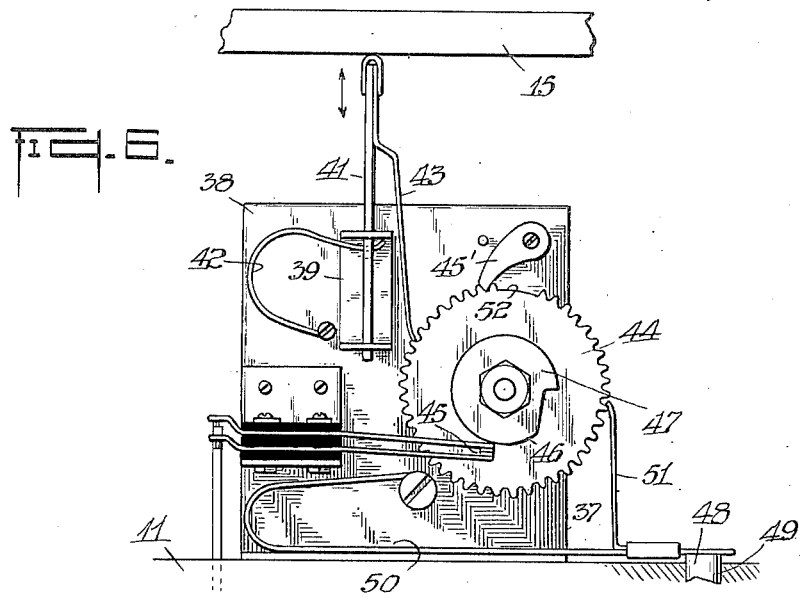

Patented Apr. 25, 1950

2,505,626

UNITED STATES PATENT OFFICE 2,505,626

COMBINED DOLL'S CRADLE AND SOUND-PRODUCING MEANS

Harry B. Palmer, New York, N. Y., assignor to American Character Doll Co., New York, N. Y., a corporation of New York Application November 22, 1946, Serial No. 711,767

12 Claims. (Cl. 46—175)

1

This invention relates to improvements in a doll's cradle, which is mechanically and electrically equipped with sound producing means and means for operating and controlling the same when a doll is placed in the cradle and the latter is set in rocking motion.

The present invention has for its principal object to provide a doll's cradle in which is installed a sound producing unit adapted to reproduce the cry of a small infant and provided with electrically operated means which is set in motion by closing a contact when a doll is placed in the cradle.

A further object of the invention is to combine with a cradle and sound producing unit of the character hereinafter described, a device for controlling the number of individual cries emitted by the sound producing unit, said device being caused to function by the rocking motion of the cradle, so that after the doll is placed in the cradle and the intermittent cries of the unit have been continued for a certain number of rocking movements of the cradle, the control device will disconnect the sound unit and the cries will cease, thereby giving the effect of an infant who has gone to sleep.

A still further object of the present invention is to provide a cradle with an intermittent crier unit and operative means responsive to a magnetic object disposed in the body of a doll, which when placed in the cradle will operate certain connections and set the crier unit to function.

I accomplish the above objects and such others as will hereinafter appear, by means of certain mechanical and electrical devices which I describe in the following specifications set forth in the appended claims and illustratively exemplified in the accompanying drawings in which:

Figure 1 is a substantially longitudinal sectional view of a doll's cradle constructed according to my invention;

Figure 2 is a substantially transverse sectional view taken on lines 2—2 of Figure 1;

Figure 3 is a top plan view of the floor of the cradle and the electric switch and magnetic means for closing the same;

Figure 4 is a top plan view of the sound producing unit and means for controlling its operation;

Figure 5 is an elevational view of the control means showing the same in operative position;

Figure 6 is a view similar to that of Figure 5 showing the control means at rest.

Referring to the drawings, 10 denotes the bed portion of a doll's cradle comprising bottom or floor 11 and outwardly inclined upstanding side and end walls 12. The floor 11 is mounted on a pair of rockers or runners 13 which are transversely disposed of the floor and spaced apart to locate each one adjacent an end of the cradle,

2 as shown in Figure 1. A ledge 14 is disposed about the interior of the side and end walls 12 to form an open frame at an elevation considerably above the floor 11, and supported upon the ledge 14 is the bed 15 of the cradle, consisting, in the present instance, of a flat piece of material, preferably a wood board, as shown. The foot end of the bed 15 rests normally upon the ledge 14, while the head or opposite end is yieldably supported above the ledge on the head 16 of a spring supported pin 17, the latter being disposed upright in a block 18 fixed to the end wall 12 below the ledge 14. The purpose of the yieldable support for the bed 15 is to allow the same to be forced down onto the ledge when the doll 19 is placed thereon and to utilize the downward movement to set in motion an intermittent crier unit 20 carried upon the floor 11.

The bed 15 carries on its under side and substantially centrally thereof a magnetically operated switch, see Figure 1, comprising an insulated base 21 carrying laterally disposed and normally spaced spring contacts 22 which are closed by the movement against one of them of a hinged arm 23. The arm 23 is hinged to a pin 24 of a plate 25 fixed to the under side of the bed so that the tendency of the arm is to hang down below the bed and out of operative contact with the spring contacts 22. The downward swing of the arm 23 is limited by a stop 26. The upward movement of the arm 23 to close the contacts is effected by means of a piece of magnetic material 27 disposed in the back of a doll 19, which material 27 attracts a similar piece of material 28 mounted on the upper side of the arm 23, the piece 28 being movable in an opening 29 in the bed 15, which is provided with a covering plate 30 for the upper end of the opening. Wires 31 run from the contacts 22 through a rheostat 32 and condenser 33 mounted below and above the floor 11, to a control switch 34 and thence to the solenoid 35 operating the crier unit 20.

Referring now to the control for the crier unit 20, the same comprises an L-shaped upright bracket 37, the foot portion thereof being mounted on the floor 11, while the upright plate portion 38 reaches an elevation just below that of the frame on ledge 14. The plate 38 carries on its face a U-shaped guide bracket 39, the parallel spaced arms thereof projecting laterally and being provided with registering slots 40 in which an upright leg 41 is slidably supported and yieldably urged upwardly, into contact with the under side of the bed 15 adjacent its head end, by means of a spring 42 fixed to the plate 38 at one end and engaged with the leg 41 while under tension at its free end. The leg 41 carries a depending spring pawl 43 which engages a toothed wheel 44 rotatably mounted on the face of the plate 38 and causes the wheel 44 to rotate when the doll 19 is placed upon the bed 15 and the latter is depressed by the weight of the doll. A detent 45' on the plate 38 is in engagement with the toothed wheel 44 to prevent reverse rotation thereof. The depression of the bed 15 and the operation of the pawl 43 imparts only the initial rotary movement to the toothed wheel 44 to close the switch 34 and start the noise producing unit to operate.

The switch 34 comprises a pair of spaced spring arms provided with contacts 45, which are normally apart, and which are disposed in the path of the high point 46 of a cam 47 rotating with and carried on the toothed wheel 44. The initial rotation of the wheel caused by the movement of the leg 41 and pawl 43 causes the high point 46 of the cam to spring the arms towards each other and close the contacts 45, as illustratively exemplified in Figure 5. The closing of the contacts 45 completes the circuit which operates the solenoid 35 and crier unit 20, which will continue to emit intermittent cries as long as the circuit remains closed. In order to continue rotation of the cam 47 until the contacts are again allowed to open, and to effect this rotation by simply rocking the cradle on its runners 13, one of the runners, preferably the runner at the head of the cradle is provided with a vertical bore 47 disposed beyond the center in which a depending peg or arm 48 is longitudinally disposed for reciprocal movement. The lower end of the arm 48 rests upon the surface of the support for the rocker and the upper end projects through an opening 49 in the floor 11 just beyond the supporting bracket 37. A spring arm 50 is fixed at one end on the plate 38 and its mid portion is bent to form a loop under tension while its free end projects along the base of the bracket 37 and rests upon the head of the pin 48. An upright spring pawl 51 is carried by the arm 50 and its upper end engages the teeth of the wheel 44, whereby each rocking movement of the cradle causes the pin 48 to lift the arm 50 and pawl 51 to advance the rotation of the wheel. There is an untoothed portion 52 in the wheel 44 and after the latter has completed one revolution the portion 52 rides into the path of the pawl 51 and the rotary movement of the wheel and cam ceases even though the rocking movement of the cradle continues. The relative positions of the low portion of the cam 47 and the untoothed portion 52 of the wheel 44 are such that the contacts 45 will be allowed to open simultaneously with the pawl 51 entering the portion 52, so that the circuit will be broken and the electrically operated noise unit also in the circuit will cease to operate.

Referring now to the crier unit 20, the same comprises any of the well known piston or diaphragm type noise producing units having a projecting plunger 53 to operate in a solenoid 54 and being suspended in a cradle like support 55, which is suspended from a plate 56 pivotally mounted in hangers 57, and which projects through an opening 58 in the floor 11. The pivotal axis of the cradle is parallel to the rocking movement of the cradle 10 and the suspension is by means of studs 59 on the plate 56 which journal in bearings 60 mounted on the floor 11 at opposite sides of the opening 58. The plate 56 is normally maintained in lateral position in any rocking position of the cradle by the depending noise unit and a spring connection 61, between a point on the plate diametrically opposite the axis of the studs 59 and a post 62 on the floor 11. The arrangement of the solenoid 54 and its normal operation causes the noise maker to function intermittently so long as the coil is energized, but when the portion 52 brings the wheel 44 to rest and the low portion of the cam 47 has allowed the contacts 45 to separate, the operation of the solenoid will cease and with it the noise making unit.

Current is supplied to the circuit through either an outside connection 63, as shown, or by means of dry cells arranged preferably in the space between the floor 11 and bed 15.

To operate the cradle, the doll 19 is placed in bed 15 so as to bring the two magnetic pieces 27 and 28 in superposed positions, as indicated in Figure 1. The arm 23 is moved to close the contacts 22 and the weight of the doll depresses the bed 15 causing the wheel 44 to rotate sufficiently to move the cam 47 and the high portion 46 against the contacts 45 to close them and complete the circuit to the solenoid. At this point in the operation the noise making unit will begin its intermittent cries. The child will then begin to impart the rocking motion to the cradle and since the initial rotation of the wheel 44 has cleared the pawl 51 of the untoothed portion 52 the pawl will engage the teeth of the wheel 44 and cause it to rotate with each rocking movement of the cradle and upward projection of the peg 48 and arm 50. As the pawl 51 again enters the untoothed portion 52 the wheel will rest and the cam 47 will have broken the contact 45 with a corresponding pause in the noise production. The child at this stage pretends her doll is asleep and discontinues the rocking motion of the cradle.

Having now described my invention and the manner in which the same operates what I claim and desire to secure by Letters Patent is:

1. In combination, a doll's cradle comprising a body mounted for rocking movement, an electrically operated sound producing unit mounted in said cradle body, and a circuit connecting a source of electric energy with said unit, comprising means for closing said circuit when a doll is placed in the cradle and for breaking the circuit when the cradle has performed a predetermined number of rocking movements, whereby the sound production will cease without necessitating a corresponding halt in the rocking operation.

2. In combination, a doll's cradle comprising a body mounted for rocking movement, an electrically operated sound producing unit mounted in said cradle body, an electric circuit to convey energy to operate said unit, comprising a switch responsive to magnetic energy to cause it to close and a second switch mechanically controlled to cause it to close, a bed in said body yieldably supported at one end and adapted to be depressed by pressure exerted when a doll is rested thereon, means operated by depression of the bed to initially close the second switch, magnetic means carried in the doll to actuate the first switch to close the circuit, and means affected by a predetermined number of rocking movements of the cradle to move the means for closing the second switch to allow the same to open and break the circuit to the sound producing unit.

3. In combination, a doll's cradle comprising a body mounted for rocking movement, an electrically operated sound producing unit mounted in the cradle body, and an electric circuit connected to said unit to operate the same, comprising a switch to close when the doll is placed in the body and a second switch responsive to pressure from the weight of the doll to cause it to close, and means responsive to a predetermined number of rocking motions of the cradle to open the second switch and break the circuit to the sound producing unit.

4. A doll's cradle, as claimed in claim 3, in which said first switch carries a magnetic section and including a doll having a magnetic section to overlie the magnetic section of the switch to cause the same to be held in closed position.

5. A doll's cradle, as claimed in claim 3, including a bed carried in said body and yieldably supported at one end in inclined position, said first switch being mounted on said bed and having a magnetic section, a doll having a magnetic section to overlie and lift the first magnetic section to close the switch, said bed yielding under pressure exerted when placing the doll thereon.

6. A doll's cradle, as claimed in claim 3, including a bed carried in said body and yieldably supported at one end in inclined position, and in which said second switch comprises normally spaced spring contacts, a cam having a low point to allow the contacts to separate and a high portion to close the contacts, a toothed wheel for rotating said cam, and a yieldably supported upright spring pawl engaging the toothed wheel to rotate the same and being disposed in the downward path of movement of said bed whereby initial rotary movement is imparted to the wheel and cam to close the second switch and cause the operation of the sound producing unit.

7. A doll's cradle, as claimed in claim 3, including a bed carried in said body and yieldably supported at one end in inclined position, and in which said second switch comprises normally spaced spring contacts, a cam having a low point to allow the contacts to separate and a high portion to close the contacts, a toothed wheel for rotating said cam, and a yieldably supported upright spring pawl engaging the toothed wheel to rotate the same and being disposed in the downward path of movement of said bed whereby initial rotary movement is imparted to the wheel and cam to close the second switch and cause the operation of the sound producing unit, said toothed wheel having an untoothed portion, a spring arm having an upright pawl normally engaging said untoothed portion and thereafter engaging the teeth because of initial movement by said first pawl, and means for intermittently lifting the arm to rotate the wheel and cam until the untoothed portion arrives at pawl and stops, the low point of the cam being disposed to release the contacts as the rotation of the cam stops.

8. A doll's cradle, as claimed in claim 3, including a bed carried in said body and yieldably supported at one end in inclined position, and in which said second switch comprises normally spaced spring contacts, a cam having a low point to allow the contacts to separate and a high portion to close the contacts, a toothed wheel for rotating said cam, and a yieldably supported upright spring pawl engaging the toothed wheel to rotate the same and being disposed in the downward path of movement of said bed whereby initial rotary movement is imparted to the wheel and cam to close the second switch and cause the operation of the sound producing unit, rockers supporting said body transversely thereof and said toothed wheel having an untoothed portion, a spring arm having an upright pawl normally engaging said untoothed portion and thereafter engaging the teeth because of the initial movement imparted by said first pawl, and a pin disposed upright in one of said rockers and projected from top and bottom thereof, beyond the lowest point of the rocker, the upper end of the pin being in contact with the spring arm at the under side adjacent its free end and resting on the support for the rocker at the lower end.

9. In combination, a doll's cradle comprising a body mounted for rocking movement, an electrically operated sound producing unit mounted in the cradle body, and a support for the unit pivotally mounted to a direction opposite the rocking movement of the cradle, and an electric circuit connected to said unit, comprising a switch to close when the doll is placed in the cradle and a second switch closed by initial rocking movement of the cradle.

10. A doll's cradle, as claimed in claim 9, including a cam to close the second switch, a toothed wheel with an untoothed portion adapted to operate the cam, means to initially turn the wheel, and further means normally engaging the untoothed portion and thereafter engaging the teeth to continue to intermittently rotate the wheel and cam, said cam releasing the second switch simultaneously with the engagement of the first means with the untoothed portion of the wheel.

11. A doll's cradle comprising a body, rockers disposed transversely thereof and a bed resting in the body and yieldably supported at one end to normally place the bed on an incline, an electrically operated crier unit and circuit therefor mounted in said cradle, and means carried by said body for controlling the circuit to set the crier unit in motion and to stop the same.

12. A doll's cradle, as claimed in claim 11, in which said means comprises an upright plate beneath the bed and carried by the body, a yieldably supported upright arm supported on said plate adapted to abut the under side of the bed at its upper end and having a depending spring pawl, an upright toothed wheel provided with an untoothed portion rotatably mounted on the plate with the teeth in the path of said pawl, a second pawl to engage the teeth and the untoothed portion of the wheel, a spring arm supporting the second pawl, a pin operating in the rocker to lift the spring arm and second pawl to rotate the wheel, a cam turning with said wheel and normally open contacts for said circuit carried by the plate and disposed in the path of the cam, whereby initial rotation of the wheel and cam by means of the downward movement of the bed closes the contacts which remain closed until the untoothed portion of the wheel is engaged by the second pawl and the cam releases the contacts to open position.

HARRY B. PALMER.

REFERENCES CITED

The following references are of record in the file of this patent:

UNITED STATES PATENTS

| Number | Name | Date |
| --- | --- | --- |
| 1,887,988 | Boiselier | Nov. 15, 1932 |
| 2,278,124 | Kowinski | Mar. 31, 1942 |
| 2,307,203 | Ehret et al. | Jan. 5, 1943 |